April 4, 1950 W. M. BURA 2,502,922
CUTTING TOOL
Original Filed March 31, 1941 10 Sheets-Sheet 5
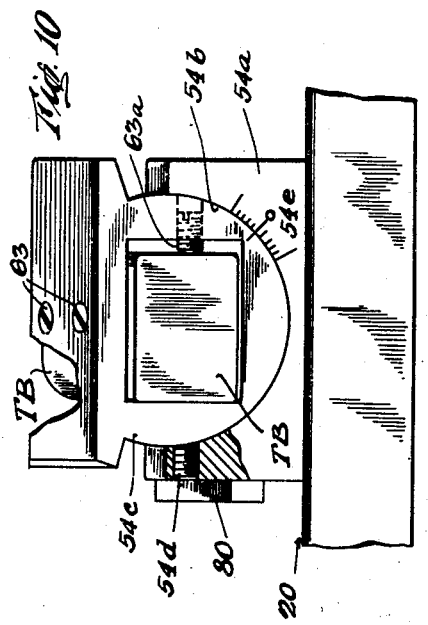
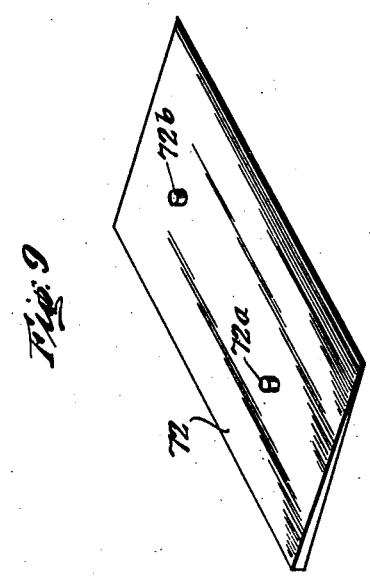
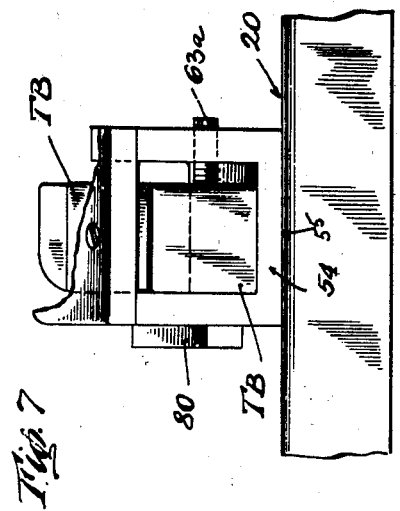
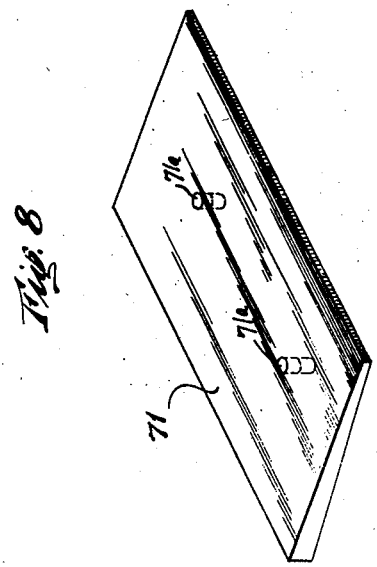
INVENTOR.
Walter Mark Bura
BY
ATTORNEYS April 4, 1950 — W. M. BURA — 2,502,922
CUTTING TOOL
Original Filed March 31, 1941 — 10 Sheets-Sheet 6
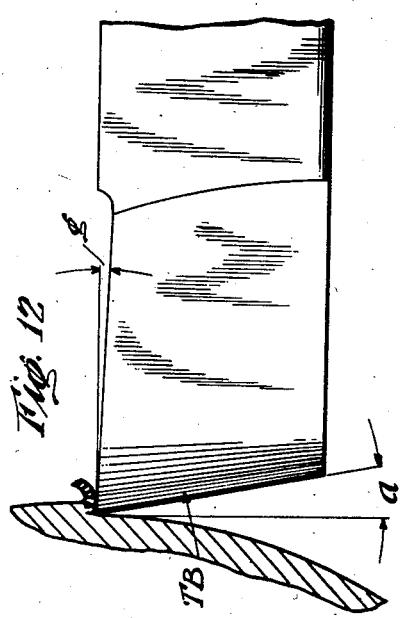
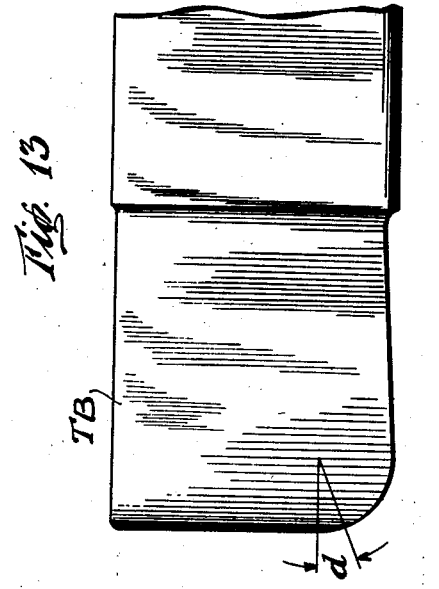
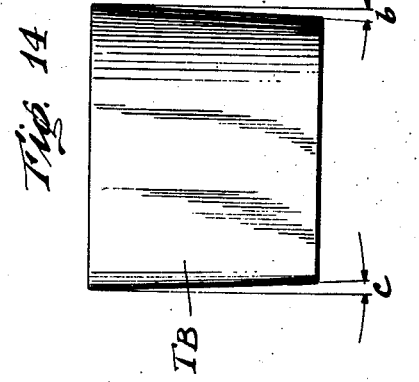
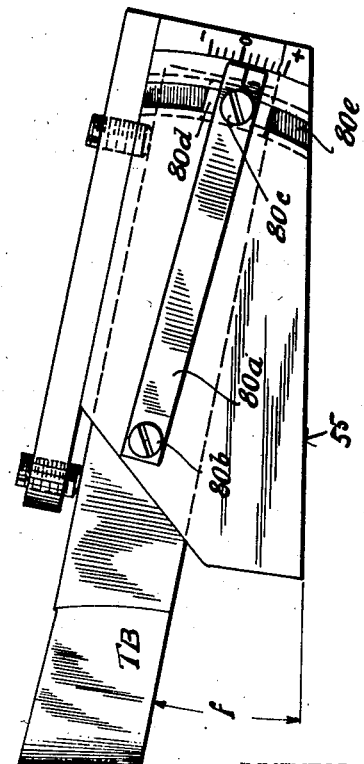
INVENTOR.
Walter Mark Bura
BY
A. A. Klicke
L. C. Krazinski
ATTORNEYS

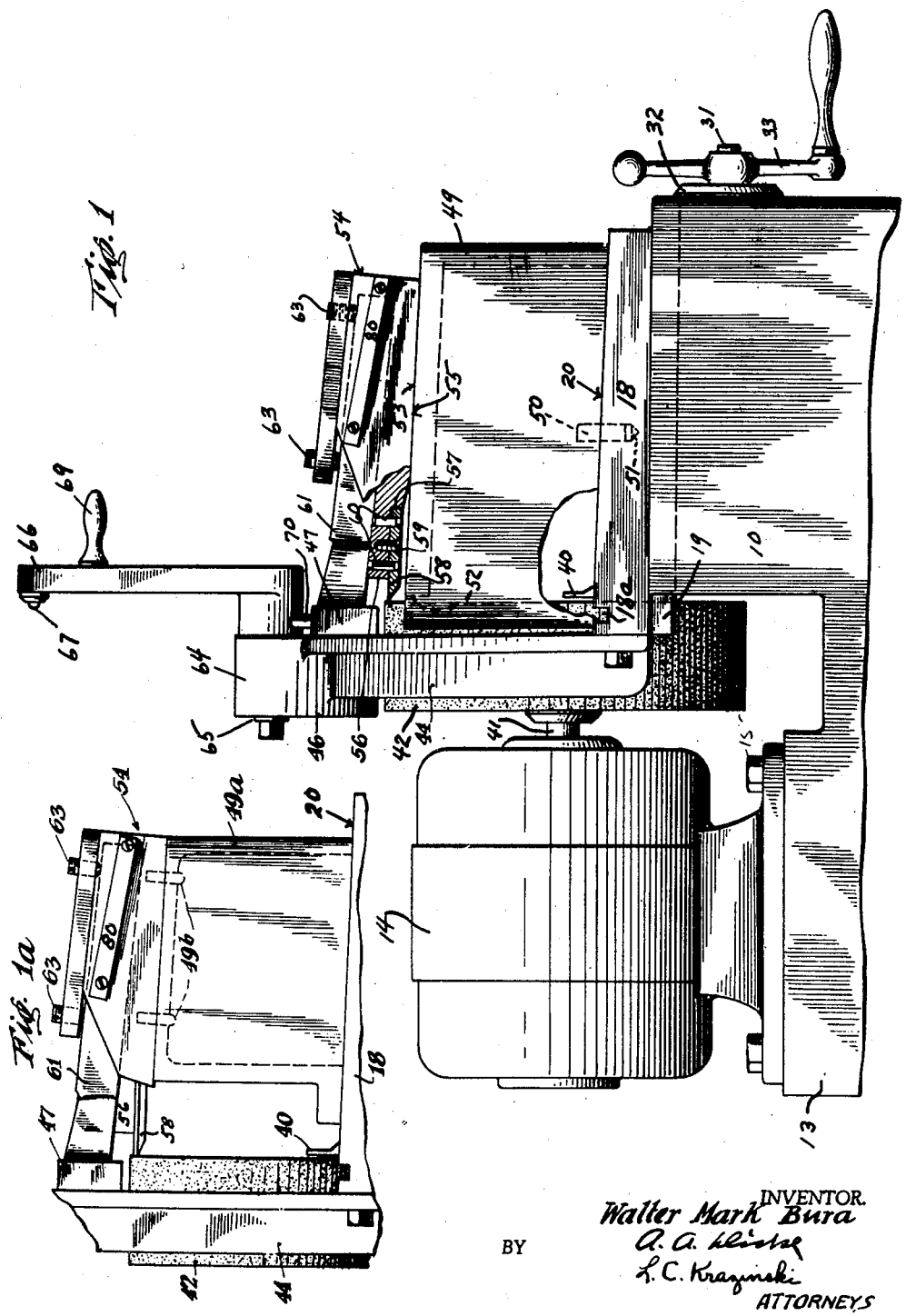

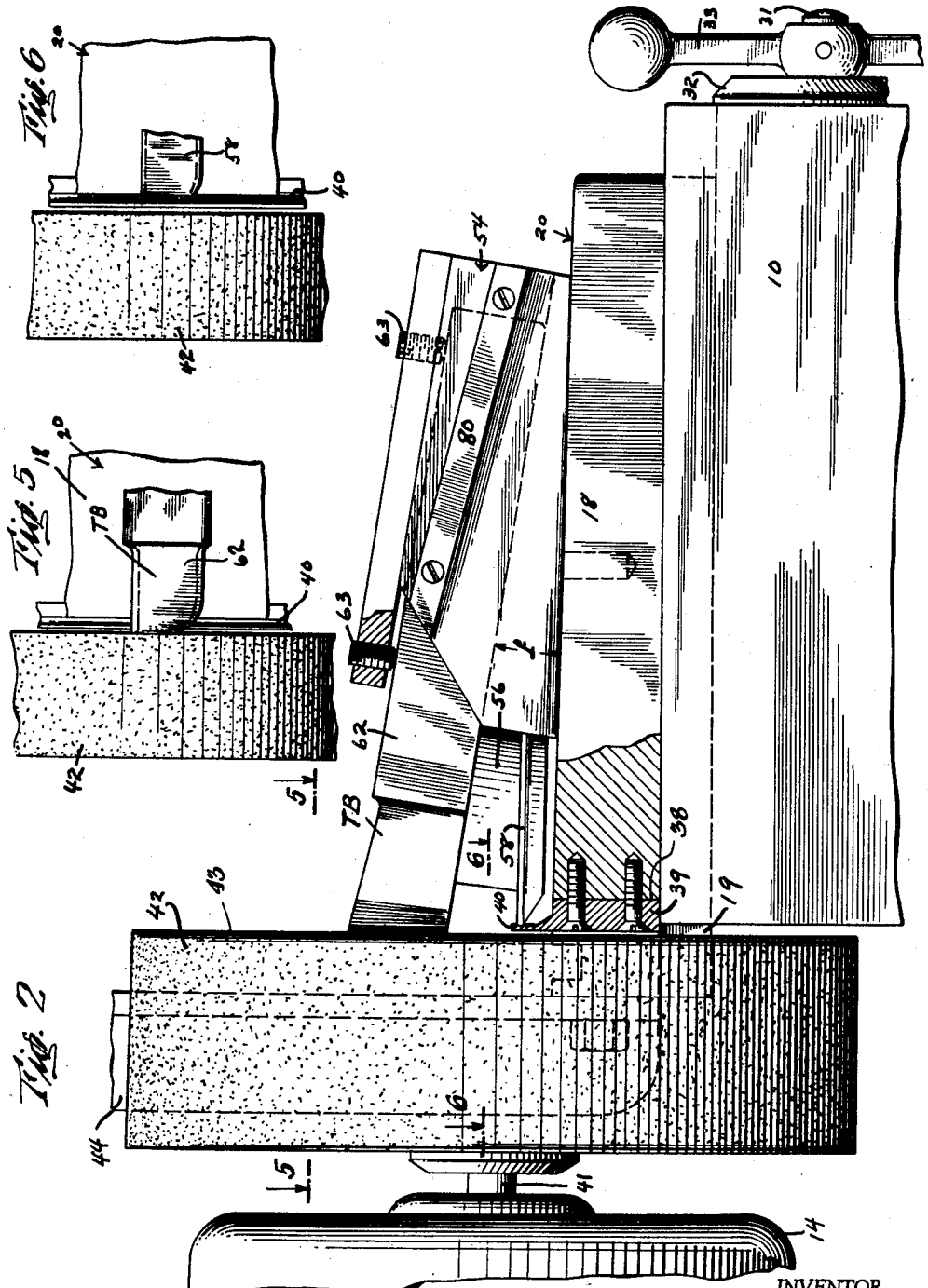

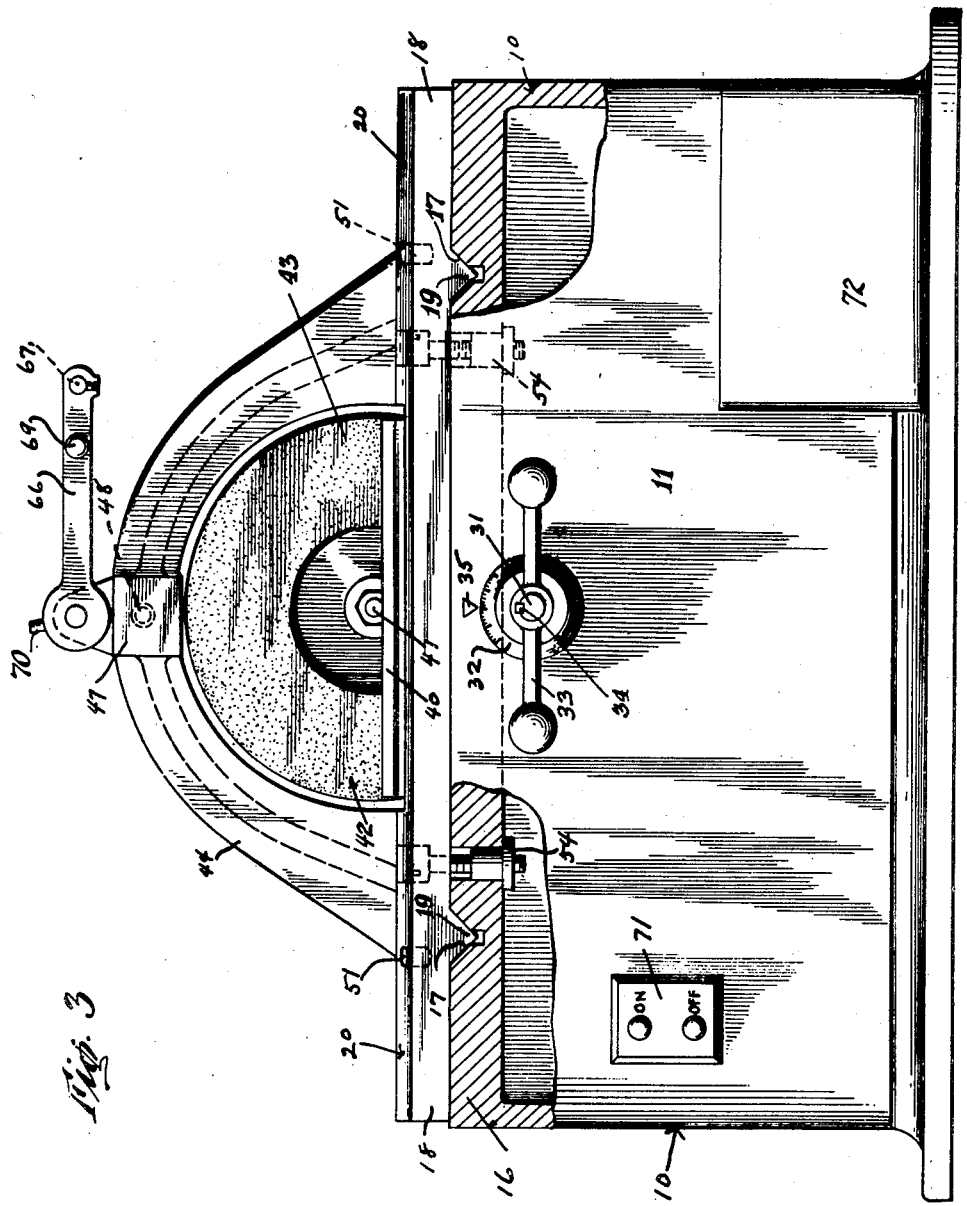

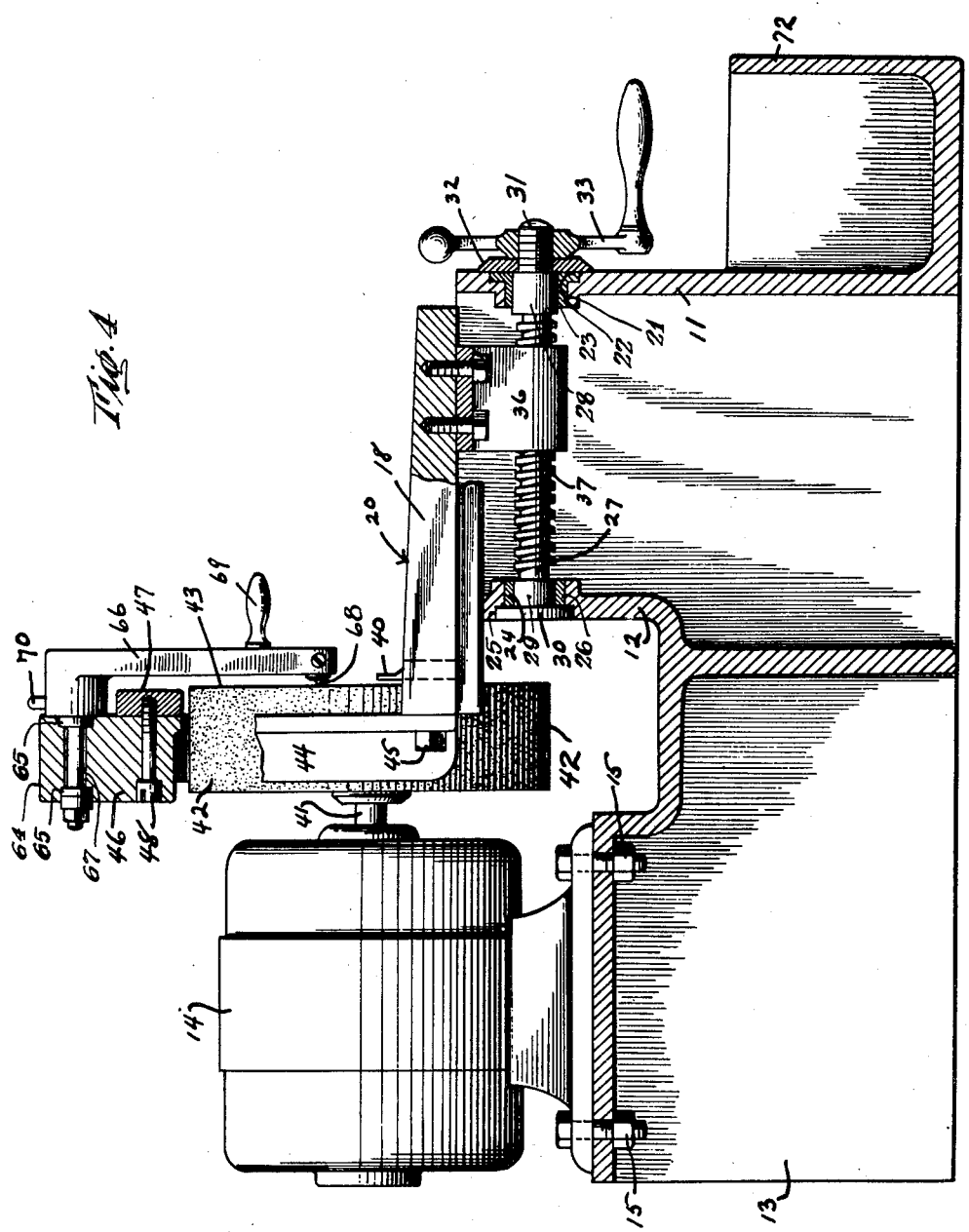

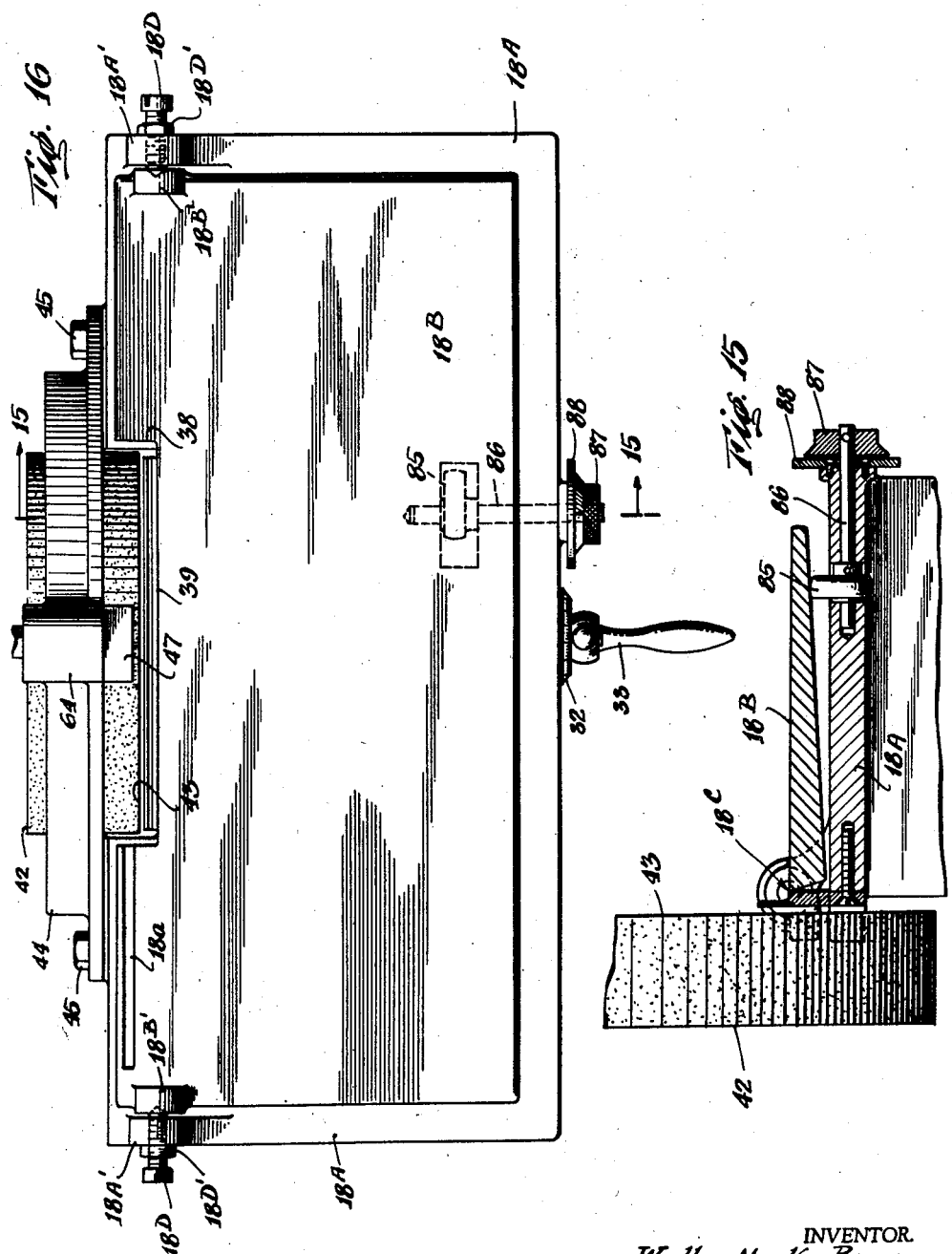

April 4, 1950  W. M. BURA  2,502,922
CUTTING TOOL

Original Filed March 31, 1941  10 Sheets-Sheet 8

INVENTOR.
Walter Mark Bura
BY
A. A. Slicke
L. C. Krazinski
ATTORNEYS

April 4, 1950 W. M. BURA 2,502,922
CUTTING TOOL
Original Filed March 31, 1941 10 Sheets-Sheet 9

INVENTOR.
Walter Mark Bura
BY
ATTORNEYS

April 4, 1950  W. M. BURA  2,502,922
CUTTING TOOL

Original Filed March 31, 1941  10 Sheets-Sheet 10

SPIRAL LEAD ANGLES OR HELIX ANGLE FOR ANY GIVEN WORK DIAMETER AND FEED IN INCHES PER REVOLUTION

INFEED .050" PER REVOLUTION

INVENTOR.
Walter Mark Bura
BY
ATTORNEYS

Patented Apr. 4, 1950

2,502,922

UNITED STATES PATENT OFFICE 2,502,922

CUTTING TOOL

Walter Mark Bura, Orange, N. J., assignor to Norton Company, Worcester, Mass., a corporation of Massachusetts Application April 26, 1941, Serial No. 390,521, now Patent No. 2,375,619, dated May 8, 1945, which is a continuation of application Serial No. 386,177, March 31, 1941. Divided and this application November 1, 1944, Serial No. 561,437

2 Claims. (Cl. 29—95)

This invention relates to cutting tools and particularly to cutting tools adapted for use in machine tools for working on metal, plastics, wood, and other solid materials.

This application is a division of my co-pending application Serial Number 390,521, filed April 26, 1941, and now Patent No. 2,375,619, granted May 8, 1945, which is a continuation of my application Serial Number 386,177, filed March 31, 1941, and now abandoned.

In modern machine tool practice, cutting tools are required having accurate clearance angles both at the ends and one or both sides thereof, which tools in many cases must also be formed with very accurate contours (as viewed for example from above). It is necessary in most cases to provide different angles of clearance at the forward end of the tool from those on the sides, as viewed in vertical planes normal to the cutting edges at the points in question. Thus the clearance angle in the direction of feed must be greater than those in a direction perpendicular to the direction of feed.

In most instances the corners of the cutting tool are rounded, the radius of curvature of the rounded corner corresponding to the requirements of the particular use to which the tool is to be put, said radius being constant or varying. It will be readily understood that if the angle of clearance at the front of the tool, viz., at the point where the rounding begins, is different from the angle of clearance at the side of the tool, viz., where the rounding ends, it will be necessary gradually to change the angle of clearance (as seen in a vertical cross-section taken along the radius of curvature at the point in question) from one extremity of the rounded corner to the other. No method for forming such a tool has heretofore been known.

It is an object of the present invention to provide a cutting tool in which the angle of clearance, as viewed in vertical planes normal to the cutting edge at the points in question, is gradually changed from one portion of the tool to another.

Another object is to provide a tool having at at least one rounded corner, the form of the corner being such that the clearance angle in a vertical plane in the direction of feed of the tool is identical or substantially identical at all points around said rounded corner.

Another object is to form a cutting tool with a cyclonoid surface as hereinafter defined.

Another object is to provide a plurality of such tools of identical contour through the use of a controlling pattern.

These and other objects and advantages of this invention will be apparent from the following specification and the accompanying drawings of several possible illustrative embodiments of the invention, in which drawings:

Fig. 1 shows a side elevation of one form of apparatus for grinding such tools showing the position of the parts while a controlling pattern is being formed;

Fig. 1a is a partial view similar to Fig. 1 but showing a modification;

Fig. 2 is a partial side elevation partly in section showing the machine of Fig. 1 in the act of grinding a tool under the control of a controlling pattern;

Fig. 3 illustrates a front elevation of said illustrative machine partly in section;

Fig. 4 is a side elevation partly in section showing the grinding wheel dresser in position for use;

Fig. 5 is a fragmentary top view of a part of the machine shown in Fig. 2 viewed on the line 5—5 of Fig. 2;

Fig. 6 is a similar section viewed on the line 6—6 of Fig. 2;

Fig. 7 is a rear view of the tool holder shown in Fig. 1 and Fig. 2;

Fig. 8 is a perspective of a bevel plate of the type which may be applied to the top of the work table when it is desired to change the effective angle thereof;

Fig. 9 illustrates a bevel plate which may be used under the tool holder of Fig. 7 for the purpose of varying the side clearances to be applied to the tool;

Fig. 10 shows a modified form of tool holder in which the tool may be adjusted around its longitudinal axis to vary the clearance to be applied to the sides of the tool;

Fig. 11 shows a modified form of the tool holder illustrated in Figs. 1, 2, 7, and 10, means being provided for varying the angle of back rake to be applied to the tool;

Fig. 12 shows a partial side view of a typical tool formed according to the present invention;

Fig. 13 is a view of the top of such a tool;

Fig. 14 is a front view thereof;

Fig. 15 is a partial view mostly in vertical section showing a modification in which the table is pivoted for ready adjustment;

Fig. 16 is a plan view of the machine as it may appear when provided with the pivoted table shown in Fig. 15;

Figure 17:
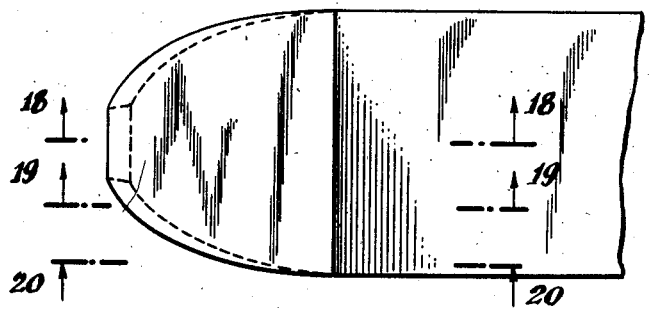
Fig. 17 is a view similar to Fig. 13 of a tool having a somewhat different profile and ground with the table slope angle at zero, as shown in Fig. 15.

Referring to said drawings, the symbol TB indicates a typical tool bit made in accordance with the invention. Referring to Figs. 12, 13, and 14, it will be noted that the front clearance or relief angle is designated by $a$, the left side clearance angle by $b$, the right clearance angle by $c$, and the back rake angle by $g$. The angle of slope of the bottom of the tool relative to the bottom of the tool holder is indicated by $f$ (Figs. 2 and 11). In the form of embodiment selected to illustrate the invention, as shown in the drawings, the numeral 10 designates a base preferably formed hollow, as shown, and having a front wall 11 and an intermediate wall 12 and having a rearward extension 13 upon which is mounted a motor 14 firmly fixed thereon as by bolts 15. The forward portion of the base is shown as provided with a top 16, formed with suitable ways such as guide grooves 17 adjacent each end, these grooves extending from the front of the housing toward its rear. Upon said housing is supported a carriage 18 being slidably mounted relative to the base as by ribs 19 fitting in said grooves 17. The upper face 20 of the carriage or bed plate 18 is usually sloped downwardly from rear to front. In the particular form illustrated, this slope is selected as 1½°. This slope determines the side clearance angles imparted to the tool and contributes to the determination of the end clearance angle as will be explained hereinafter.

Any suitable means may be provided to shift the table 18 forwardly and rearwardly upon the base, viz., with respect to the grinding wheel. In the form illustrated the upper part of the wall 11 is provided with a bore or opening 21 the front end of which is enlarged as at 22 and in this opening is fitted a correspondingly shaped bushing 23. In the upper part of the wall 12 and axially aligned with the bore 21 is a bore 24 having an enlarged rear end 25. In the bore 24 is fitted a bushing 26. A feed screw, indicated in general at 27, is provided at its front end with a journal 28 fitting the bushing 23 and at its rear end with a journal 29 fitting the bushing 26. The rear end of the feed screw has a flange portion 30 which fits the bore portion 25 so that the feed screw is held from forward movement. This feed screw has a reduced and threaded portion 31 projecting forwardly from the journal 29 and upon which projection is mounted a graduated washer or dial indicator 32 which rests against the front face of the wall 11. A crank handle 33 is screwed on the end 31 and bears against the washer 32 which, being of greater diameter than the bore 22, prevents rearward movement of the screw. A key 34 serves to prevent rotation of the parts 32 and 33 on the feed screw after these parts have been assembled and properly adjusted. An index point 35 is scribed on the wall 12 to cooperate with the graduations of the washer 32. Secured to the under side of the forward portion of the carriage 18 is a nut 36 which engages the threaded portion 37 of the feed screw 27. Thus rotation of the crank 33 will cause movement of the carriage in the desired direction on the housing.

The rear edge of the carriage 18 is recessed as at 38 and in the recess is fixed a bar 39 formed with an abutment ledge 40 extending above the face 20.

The motor 14 has a shaft 41 on the front end of which is mounted a material removing device such as a cup-shaped grinding wheel 42 having an annular grinding face 43. This grinding wheel has its forward portion revoluble in the recess so that, by manipulation of the feed screw, the abutment ledge 40 may be adjusted with respect to the grinding face 43. A suitable support such as an arch frame 44 has its ends secured to the carriage 18 at each side of the recess 38 as by bolts 45. This arch frame extends over the wheel 42 and, centrally above the wheel, is provided with a boss 46. A block 47, comprising a controlling pattern grinding block, has its front face accurately formed as a plane surface and is fixed to the boss by screw 48. The front face of this block 47 lies somewhat to the rear of and parallel to the grinding face 43.

When a pattern is to be ground there is removably mounted on the carriage 18 a spacer or step block 49, which is properly positioned when in use by dowels 50 fitting in dowel holes 51 in the carriage 18. This spacer is recessed at 52 to embrace the front upper part of the wheel 42 and its upper face 53 is in the form shown inclined 1½° from the horizontal so as to lie parallel to the face 20 when the spacer is in position. Any other suitable holding means may be used to hold the parts 18 and 49 in properly adjusted relation.

A tool holder is indicated in general at 54 and has an accurately formed plane under surface 55 to rest and slide or turn on either of the surfaces 20 or 53. This box 54 has at its lower forward end an extension 56 which is provided on its under side with a rearwardly opening recess 57. In this recess is mounted a controlling pattern 58 which projects rearwardly of the tool holder and is secured and positioned accurately thereto by the screw 59 and dowels 60. In Fig. 1 there is shown a master form 61 which may represent either a tool which is to be reproduced as will be presently explained, or other suitable master pattern such as a template. The tool holder is arranged in the form shown to hold the bottom face of tools to be ground, or the master tool or master pattern to be followed, at an angle of 8½° to its bottom face. Screws 63 are employed to hold the tool in place.

On the boss 46 is provided a bearing boss 64 having anti-friction bearings 65 at each end of an opening. In these bearings is mounted a shaft 67 on the front end of which is fixed an arm 66 carrying a diamond trueing tool 68. The arm 66 is provided with a handle 69 and on the hub of the arm is fixed a stop pin 70.

It is not deemed necessary to show the circuit connections for the motor but a switch to control this motor may be conveniently located at 71 on the wall 11. At 72 is a well for holding water so that if the noses of the tools get too hot during grinding they may be dipped in the water and cooled off.

In the operation of the invention there is first prepared (see Fig. 1) a master tool or master pattern such as 61. This master is placed in the tool holder 54 and a blank for the controlling pattern 58 of greater longitudinal and lateral dimensions than the nose portion of the master form is fitted in the tool holder. The spacer 49 is next assembled on the carriage 18. The tool holder is now placed on the surface 53 and moved gradually to bring the nose of the master pattern against the block 47 while, at the same time, the controlling pattern engages the grinding face. Prior to grinding, the feed screw is turned to adjust the wheel dresser while the wheel is being dressed which fixes the proper relative position of the front face 43 of the grinding wheel 42 relative to the abutments 40 and 47, after which the screw handle 33 is not touched. The tool holder is then swung laterally from one side to the other while the master form 61 gradually approaches block 47, until finally the nose of the controlling pattern will be ground to exact correspondence with the nose of the master tool or pattern. The step of forming a controlling pattern has then been accomplished.

As shown in Fig. 1a the large spacer box 49 may be dispensed with by providing a foot 49a attached to the bottom of the tool holder 54 as by dowel pins 49b. The bottom of the foot 49a is parallel to the bottom surface of the tool holder 54 and is free to slide upon the surface 20.

To now make a duplicate of the master tool or pattern the master tool or pattern is removed from the tool holder and a work piece such as a tool blank, or a dull tool to be reground 62 is inserted. The spacer 49 is removed and the tool holder placed on the surface 20 and urged towards the grinding face until the controlling pattern 58 engages the abutment ledge 40, the latter being located as far in front of the wheel face as the surface 47 is behind it. The tool holder is now swung from side to side in forming the controlling pattern, only in this case, the controlling pattern is gradually brought against the abutment ledge 40 during the swinging operation. When the operation is completed the nose of the work piece will exactly duplicate the nose of the master tool or pattern 61 in contour and will have the clearance determined by the slope angle e of the table and the angle of tilt f of the tool.

Obviously, a dull tool will be resharpened in exactly the same manner as in forming a new tool bit from a blank, the dull tool being the equivalent of a blank when thus resharpened but naturally requiring less time for regrinding than the blank.

While the angle of the table is here shown as 1½° application of the bevel plate 71 (Fig. 8) to the surface of the table will enable other side clearance angles to be obtained, it being obvious that as many of these plates of different bevels may be employed as there are tools with different side clearance angles to be ground. Pins 71a project down into holes in the table 18 to hold plate 71 in position.

Since in the form shown the table surface 20 is (the bevel plate 71 not being used) arranged with a slope of 1½°, viz., 1½° to a plane at right angles to the wheel face and as the angle f between the bottom of the tool and the bottom of the tool holder is shown as 8½°, it is obvious that the front clearance given to the tool will be 10° since at this time the tool is held in a vertical plane at right angles to the wheel face. It will also be noted that when the tool holder is swung to grind the sides of the tool, the effect of the angle f will have completely disappeared and the clearance applied to each side will be 1½°. It will also be noted that as the tool holder is gradually swung from its first mentioned position to the positions at which the sides of the tool are ground, the effect of the angle f will gradually change from its maximum of 8½° to zero. Therefore, when the corner of the tool is rounded, as shown in the drawings, the clearance angle as viewed in vertical planes normal to the cutting edge at the point in question will be gradually changed from 10° when the angle d in Fig. 13 is zero to 1½° when the angle d becomes 90°. The same effect is produced at the right hand corner.

With a tool holder of the form shown in Fig. 7 the side clearance produced will be equal, viz., they correspond with the slope e of the table. In order to provide for a difference in the side clearance angles the use of a bevel plate 72 (Fig. 9) under the tool holder 54 is contemplated. This bevel plate is shown provided with pins 72a and 72b which fit in suitably located holes in the bottom of tool holder 54 to properly locate the bevel plate 72 in relation thereto. Assuming that the angle of plate 72 is 1° and the plate is positioned so as to tilt the tool holder to the right in Fig. 7, it is clear that the clearance angle on the right of the tool will be increased 1°, viz., to 2½°, and that the clearance angle on the left will be decreased 1°, viz., to ½°. In other words, the relationship of the several angles mentioned is $$e = \frac{b+c}{2}$$

If the angle through which the tool holder is tilted equals the angle $e$, zero side clearance will be given at one side and double clearance on the other. The tilt may of course be carried so far as to give a negative clearance on one side, if desired. It will also be noted that $$a = e + f = \frac{b+c}{2} + f$$

and $a_x$ (the clearance angle at any point of a rounded corner) equals $e + f$ cosine $d$ (the clearance being measured in a generally vertical plane normal to the tool contour at the point in question).

Another and most important characteristic of the conformation of the rounded portion of the tool produced by the method and apparatus described is that the clearance angle at any point of a rounded corner when measured in a generally vertical plane longitudinally of the tool is independent of the angle $d$, i. e., is constant. This is the ideal conformation which was never attained heretofore. This conformation is the ideal one because the individual parts of the work approach the tool while moving in vertical planes (in lathes of usual construction) and as the clearance should be neither too great nor too small the ideal desideratum is to hold the clearance in such longitudinal vertical planes constant at all points of the rounded corner or corners. This ideal conformation has for the first time been made possible by the method and apparatus described.

Instead of using detachable bevel plates, such as 72, a form of construction similar to that shown in Fig. 10 may be employed. In this form, the tool holder may consist of a base portion 54a formed with a bore 54b whose axis is inclined at an angle of say 8½° to the bottom surface of the base. Within said bore is located the cylindrical portion 54c of the tool holder proper. The tool is shown as held in place by top screws 63 and side screws 63a. The tool holder proper may be turned within the said bore to the desired angle of adjustment, it being held in place as by means of a set screw 54d. As shown at 54e, suitable graduations may be applied to indicate the extent the tool holder proper has been turned relative to the base.

It will therefore be seen that the sum of the angles of side clearance may be varied by using different bevel plates 71 (or by utilizing the tiltable table form of construction illustrated in Figs. 15 and 16) and that the distribution of the sum of the side clearance angles may be varied by the use of bevel plates such as 72 or the form of tool holder shown in Fig. 10.

If desired, means may also be provided to vary the angle of tilt of the tool TB. This may be done by providing suitable bevel plates under the tool holder 54 or by providing a base therefor for engaging the surface 20 (and 53) said base (not shown) being pivoted to the tool holder 54 near the rear end. In that event suitable graduations would be provided to indicate the angle $f$. In the alternative, a spherical seat might be provided in the base 54a of Fig. 10 to provide for variation of distribution of the side clearance and also for varying the angle $f$.

Means will now be described for grinding the top of the tool bit and applying the proper back rake thereto. By reference to Figs. 1 and 16, it will be noted that the carriage 18 is formed with a groove 18a formed in its top surface 20. This groove extends substantially to the grinding wheel. By referring to Figs. 1, 2, 7, and 8, it will be noted that a tongue 80 is formed on or attached to the left side of the tool holder 54. This tongue is adapted to fit in the groove 18a and to permit the sliding of the tool holder back and forth in said groove in such a position as to cause the face of the grinding wheel to grind the top face of the tool and thus apply thereto the proper rake. In the form shown in Fig. 2, the back rake is as shown and the side rake will be 0°. The side rake however can be varied by using the form of tool holder shown in Fig. 10.

In Fig. 11 is illustrated a form of construction by means of which the back rake may be readily varied. In said construction the tool holder may either be of the form shown in Fig. 7 or the one shown in Fig. 10, or other suitable form. The guide tongue 80a instead of being fixed to the tool holder is pivoted to the tool holder at 80b and means are provided such as a screw 80c threaded into a T-block 80d slidably engaged in a circular T-slot 80e. By loosening screw 80c the tongue 80a may be shifted to the desired position and locked in place by turning down screw 80c. Graduations as shown may be provided to facilitate setting. As the groove 18a is parallel to the face of the grinding wheel the top surface of the tool will be formed parallel to the position to which tongue 80a is adjusted to provide either positive or negative top rake of the desired extent. If the adjustable tongue 80a is used on a tool holder of the type shown in Fig. 10, both the back rake and the side rake may be adjusted.

In Figs. 15 and 16 is shown a slightly modified construction. In this form, instead of utilizing bevel plates such as 71 (Fig. 8) in order to vary the angle of the table surface 20 relative to the grinding wheel the table 18B is pivoted relative to its base 18A as at the point 18C. This may be readily done by providing the table base 18A with upstanding bosses 18A' and providing the pivoted table 18B with bosses 18B'. Pivot screws 18D threaded into the bosses 18A' provide a suitable pivot bearing for the table 18B. Lock nuts 18D' are preferably provided to prevent loosening of the pivot screws. Any suitable means may be provided for adjusting the table 18B about its pivots. In the form shown this is accomplished by means of a cam 85 mounted for rotation with a shaft 86 having thereon a preferably graduated adjusting knob 87 arranged in front of a suitable graduation bearing member 88 attached to the table base 18A which also supports the shaft 86. The cam 85 may be an eccentric or may be of spiral form such as an Archimedes spiral. It will be readily seen that as the knob 87 is rotated the front of the table will be lifted and lowered to vary the slope of the table 18B.

In the position shown in Fig. 15 the table surface 18B is horizontal, i. e. normal to the wheel face so that the surface ground will be cylindrical.

The form of tool shown in Fig. 17 is similar to that shown in Figs. 12, 13, and 14, with the exception that only a small part of the front of the tool is flat, the rounded corners therefore comprising a larger part of the tool profile.

Figure 18:
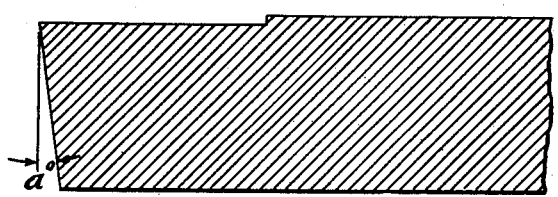
Fig. 18 is a longitudinal vertical cross-sectional view taken along the line 18—18 of Fig. 17.
Figure 19:
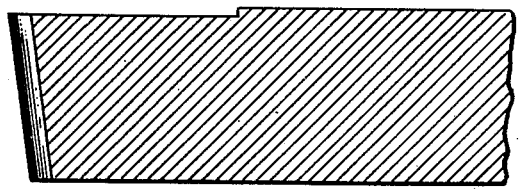
Fig. 19 is a view similar to Fig. 18 taken on the line 19—19 of Fig. 17.
Figure 20:
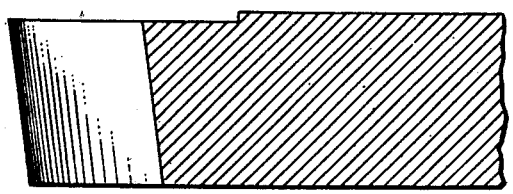
Fig. 20 is a similar view taken on the line 20—20 of Fig. 17.

The cross-sectional views shown in Figs. 18, 19, and 20, show clearly that the clearance angle $a$ measured in generally vertical planes extending longitudinally of the tool is substantially constant at all points of the tool. This angle remains exactly constant when the table is at right angles to the wheel face, as shown in Fig. 15.

The applicant is unable to state the mathematical name of the surface generated by the above described process and apparatus as the mathematicians have apparently not as yet ascribed a name thereto. The surface may be defined as that surface which is generated by moving a straight line (generatrix) along a planar curve (directrix) while maintaining a constant angle between said straight line and a line in the plane of the curve normal to the curve at the instant point of intersection of the generatrix with the directrix. In the specific case where the slope of the tool holder supporting table is zero, the surface generated is a cylinder (although it may be a cylinder of non-circular cross-section as in Fig. 17). Furthermore, in that instance where the table is not at right angles to the wheel face the surface is conical for any part thereof where the contour of the tool (viz. the directrix) is circular. However, in that instance where the plane of the table is not at right angles to the plane of the wheel face and the directrix is a curved line other than circular, no accepted name for the surface is known. The applicant has therefore assigned thereto the name, "cyclone" surface, to the general form of surface generated by the apparatus and method, viz., that surface which is generated by moving a straight line (generatrix) along a planar curve (directrix) while maintaining a constant angle between said generatrix and a line in the plane of the curve normal to the directrix at the instant point of intersection of the generatrix with the directrix.

The tool generated by my apparatus and process has a "cyclone" surface whose directrix plane is at such an angle to the plane of the bottom of the tool that uniform or substantially uniform relief in the direction of tool feed will be provided at all points of the tool contour. Where the tool is an in-feed or plunge-cut tool the angle of the bottom of the tool to the directrix plane is the desired angle of front relief minus the angle of slope of the table, if any. This is effected by the use of the tool holder 54 which causes the front end of the tool to be pointed up with reference to the directrix plane, viz., any plane parallel to the table surface. Likewise, where the tool is a turning tool, the angle of the bottom of the tool to the directrix plane is the desired angle of side relief minus the angle of slope of the table, if any. This may be accomplished by the use of a wedge under the tool holder as shown in Fig. 9 or by properly adjusting the tool holder of Fig. 10. The tool conformation produced is, in the absence of a known name therefor, herein termed a cyclonoid conformation.

Figure 21:
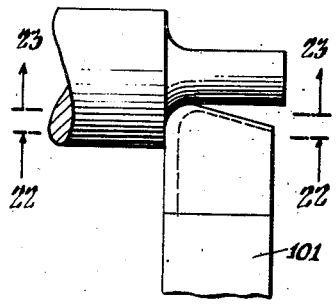
Fig. 21 is a plan view of a form of turning tool embodying the invention.
Figure 22:
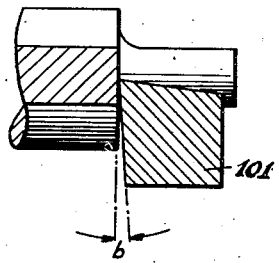
Fig. 22 is a vertical cross-sectional view of the tool of Fig. 21 taken on the line 22—22 of Fig. 21.
Figure 23:
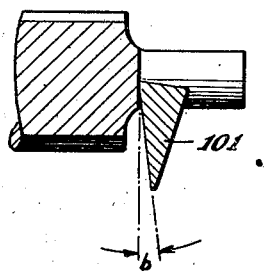
Fig. 23 is a vertical cross-sectional view of the tool of Fig. 21 taken on the line 23—23 of Fig. 21.

Referring now to various other forms of tools made in accordance with the invention, reference may first be had to Figs. 21, 22, and 23. The tool 101 shown therein is a turning tool, i. e., a lathe tool which is fed in a direction generally parallel to the axis of the work. Therefore, its clearance angle $b$, in the direction of feed, is greater than the front clearance angle. This is apparent from the dotted outline in Fig. 21 which indicates the bottom profile of the cutting end of the tool. Fig. 22 shows a vertical cross-section taken along the line 22—22 of Fig. 21, and Fig. 23 is a similar view taken along the line 23—23 of Fig. 21. It will be noted that although the section 23—23 is taken at the curved portion of the tool nose, the angle of clearance $b$ is the same as at the straight side portion of the tool, as shown by Fig. 22.

Figure 31:
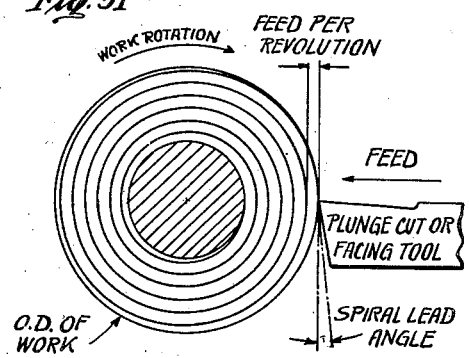
Fig. 31 is a cross-section of a work piece showing the path of a plunge-cut or facing tool relative to the work.
Figure 32:
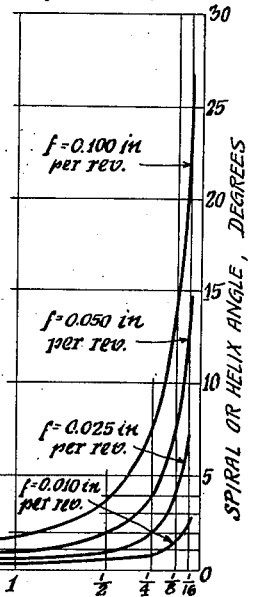
Fig. 32 is a chart showing graphs indicating the theoretically necessary relief angles on tools for various minimum work diameters and various feeds per revolution.

On the general subject of clearance angles, attention is called to Figs. 31 and 32. An in-feed tool, such as a plunge-cut or facing tool, generates an Archimedes spiral on the work, in which the distance between successive turns measured radially is constant, as shown in Fig. 31. The theoretically minimum front relief angle must not be less than the spiral lead angle, which is the angle between a tangent to the spiral at any point and a line perpendicular to the radius of the work piece at that point. At any given point this angle is the one whose tangent is equal to the radial distance between successive turns of the spiral (in-feed per revolution) divided by the instantaneous circumference of the work piece at that point, or $$a = \tangent^{-1} \frac{(f)}{\pi d}$$

Where $a$=spiral lead-angle for diameter $d$.
$f$=in-feed in inches per revolution.
$d$=instantaneous diameter in inches at which spiral angle is being determined.

Figure 33:
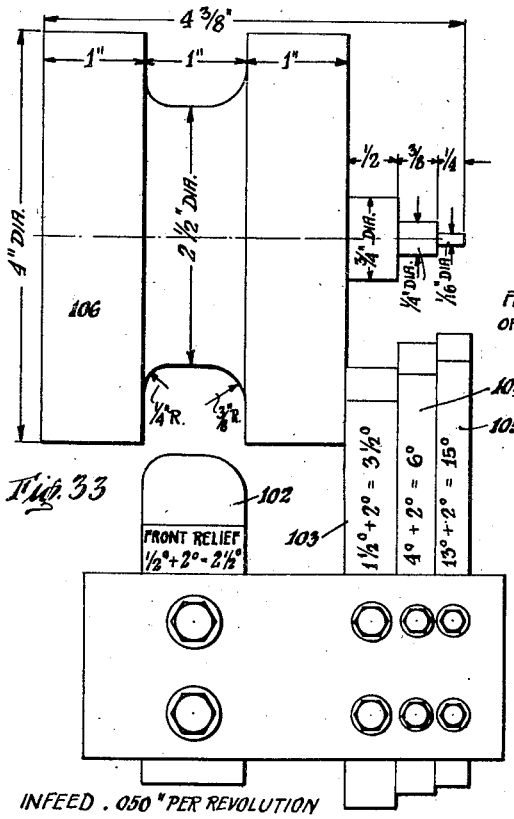
Fig. 33 represents the drawing of a work piece having certain dimensions, together with a tool set-up capable of producing said work piece.

$f$ is constant for a given operation but $d$ diminishes as the work progresses. Therefore, the lead angle $a$ increases in amount as $d$ decreases. The chart, Fig. 32, indicates how the spiral angles vary for various work diameters and various feeds. It is clear from the chart that the spiral angle is not appreciable for diameters above one inch, except for heaviest feeds. For a feed of .050 inch per revolution, for example, the spiral angle is approximately 1° at one inch diameter. Careful attention to the spiral angle becomes important, however, when small diameters are reached. It is clear that in such tools the amount of front relief must vary in accordance with the minimum diameter to be cut thereby. In this connection attention is directed to Fig. 33 in which tools 102, 103, 104, and 105 operate upon a work piece 106 which had an original diameter of 4 inches. The tool 102 penetrates the work until a diameter of 2½ inches is reached. Assuming an in-feed of .050 inch per revolution, it will be seen that the spiral angle at 2½ inches is about ½°. Experience has shown that it is not satisfactory to adopt the spiral angle as the proper front relief angle. To take care of variations in tool setting it has been found desirable to arbitrarily add a certain amount, say 2°, to the spiral angle to achieve the most satisfactory front relief angle. Therefore, the front relief angle for tool 102 is taken at ½°+2°=2½°. Tool 103 must work to a minimum diameter of ¾ inch. Therefore, as seen in Fig. 32, the spiral angle is about 1½° and the front relief angle is 1½°+2°=3½°. Similarly, tool 104, which operates to a minimum diameter of ¼ inch, must have a front relief of 4°+2°=6°, and tool 105, which must operate to a diameter of 1/16 inch, must have a front relief of 13°+2°=15°. Thus, it will be seen that tools held in the same tool holder and fed into the work the same amount per revolution must necessarily be provided with different front relief angles to secure the most desirable results.

In longitudinally-fed lathe tools the minimum relief angle, such as the angle $b$ in Figs. 22 and 23, must not be less than the lead angle of the helix generated by the tool point upon the work. The lead angle of such a helix is defined as follows:

$$b = \tan^{-1}\left(\frac{f}{\pi d}\right)$$

Where b = the helix angle.
f = feed in inches per revolution.
d = finish turned diameter (minimum).

Since the equation for the helix angle is the same as the equation for the angle of an Archimedes spiral, the chart of Fig. 32 is applicable also in determining the side relief angle in longitudinal feed (turning) tools. Knowing the feed per revolution and the minimum work diameter, the helix angle can readily be computed from the formula or by reference to a chart, such as Fig. 32. However, since there is always danger that the tool may be tilted sideways in its holder, it is preferable to specify a side relief angle several degrees greater than the helix angle.

By use of the above considerations it is possible to determine the ideal minimum relief angle for any tool if the conditions of its use are known. By utilizing the ideal minimum relief angle it is possible to give maximum strength to the cutting edge and maximum capacity for heat conduction therefrom. It would be futile, however, to specify such angles unless a machine were available for producing them accurately. This may be accomplished, however, by the machine shown in the drawings and described above. This machine not only provides correct front and side relief but gradually blends the one into the other.

Figure 24:
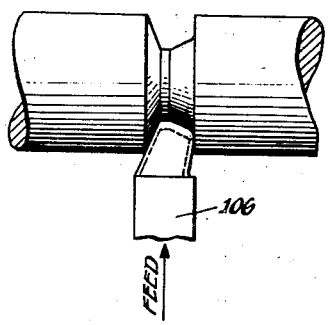
Fig. 24 is a plan view of a form of plunge-cut tool embodying the invention shown in connection with a work piece upon which it is operating.

Fig. 24 shows an in-feed tool 106 of the particular contour there shown. The effective portions of this tool are the front, the left side, and the inclined portion to the right of the point. The right side of the tool, except at the corner, never comes into play. The essential thing is to provide the minimum relief angle in the direction of feed. This may be accomplished by having the table slope zero, as shown in Fig. 15, and arranging the tool in the tool holder with an amount of uptilt equal to the desired front clearance. The resulting tool will, therefore, have exactly the same relief in the direction of in-feed at all points of its effective cutting edge.

Figure 25:
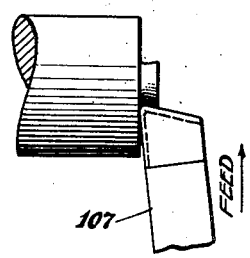
Fig. 25 is a plan view of a form of facing tool embodying the invention shown in connection with a work piece upon which it is operating.

Tool 107 of Fig. 25 is a facing tool and therefore is of the in-feed type. In view of the side relief shown, this tool can best be ground by setting the work table to a certain slope, viz., a slope required to give the desired side relief.

Figure 26:
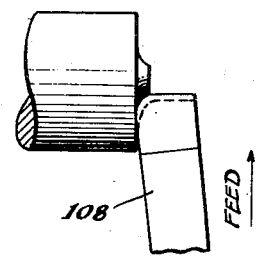
Fig. 26 is a plan view of a form of finish facing tool embodying the invention shown in connection with a work piece upon which it is operating.

The tool 108 of Fig. 26 is again a facing tool but as no cutting is accomplished beyond the corner, this tool may be ground by setting the table at zero and adjusting the tool holder to secure the desired amount of relief.

Figure 27:
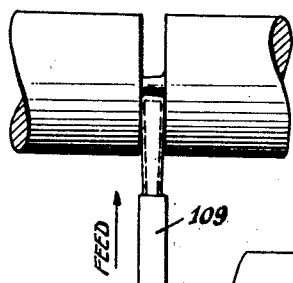
Fig. 27 is a plan view of a form of cut-off tool embodying the invention shown in connection with a work piece upon which it is operating.

Fig. 27 shows an in-feed, cut-off tool 109. Such tools require a small amount of side clearance and a greater amount of end clearance. As shown, the front edge of the tool is formed at a slight angle so as to leave the tip on the piece which is being cut off. In grinding such a tool the table is preferably set at an angle of about 1½° to 2° to provide the desired side clearance, and the tool holder is arranged to provide sufficient uptilt to the nose of the tool to give the desired amount of front clearance.

Figure 28:
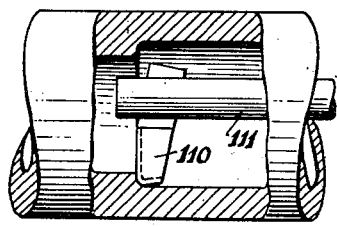
Fig. 28 is a plan view of a form of boring tool mounting the invention shown in connection with a part being bored.

Fig. 28 shows a boring tool 110 held by a boring bar 111. This tool is essentially a turning tool and may be formed like the tool of Fig. 21 except that it is formed in reverse.

Figure 29:
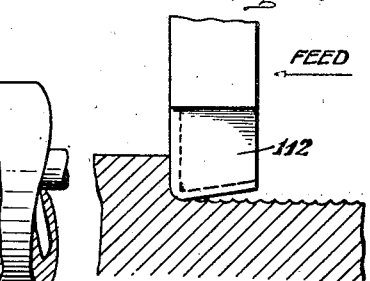
Fig. 29 is an elevation of a planer or shaper tool made in accordance with the invention shown in connection with a work piece upon which it is operating.

Fig. 29 shows a planar or shaper tool 112. Since the feed in planars and shapers does not occur during the cutting stroke, it is not essential that the clearance in the direction of feed be greater than the clearance in the other direction. Furthermore, no consideration need be given to the spiral angle or helix angle since there is only purely straight-line motion of the tool with respect to the work. In view of the shock occurring when the tool strikes the work at the start of the cutting stroke, it is essential to make the tool edge as strong as possible by using minimum relief, thus giving maximum support to the cutting edges. This form of tool may be ground by arranging the tool holder to give zero inclination and setting the table at, say 3°, or such other angle as may be desired. This will assure the same side relief as end relief.

Figure 30:
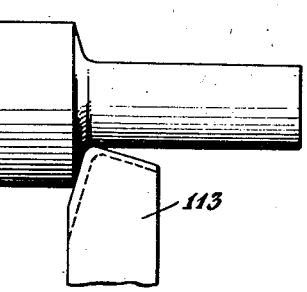
Fig. 30 is a plan view of a form of turning tool similar to Fig. 21, but showing a tool whose left cutting edge is inclined to the axis of the tool.

Fig. 30 shows a turning tool 113 which is quite similar to the tool shown in Fig. 21. Such a tool may desirably be ground by setting the table at zero, as shown in Fig. 15, arranging the tool holder so as to give an upward tilt to the tool equal to the amount of front clearance desired, and tilting the tool in the tool holder an additional amount to give the desired additional side clearance. This may be done by using a tool holder like the one shown in Fig. 10, or using the tool holder of Fig. 7, together with a wedge, such as the one shown in Fig. 9.

Figures 34, 35:
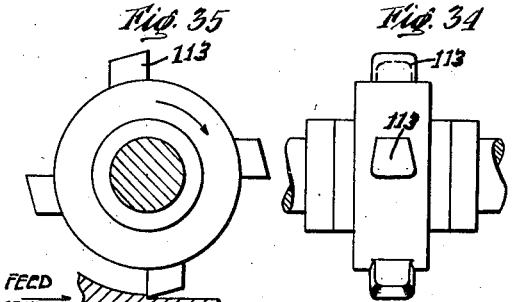
Fig. 34 is a radial view of an inserted-bit radial-milling cutter.
Fig. 35 is an axial view of the cutter shown in Fig. 34.

Figs. 34 and 35 show a milling cutter having inserted cutter bits 113. Such bits are preferably ground with more clearance on the front than on the sides. This may be accomplished by setting the table to the desired amount of side clearance and arranging the tool in the holder to tilt up the desired amount of additional end clearance.

Figures 36, 37:
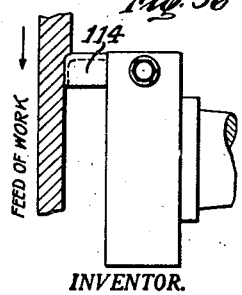
Fig. 36 shows an inserted-tool axial-milling cutter or fly-cutter.
Fig. 37 is an axial view thereof.

Figs. 36 and 37 show a milling cutter of the face-milling type in which one or more inserted tool bits 114 are used. These bits may be ground like those shown in Figs. 26, 28, or 29.

While the apparatus described above may be employed to produce the various tool forms described above, it is to be understood that a grinding machine of the form disclosed in my co-pending application Serial Number 433,313, filed March 4, 1942, and now Patent No. 2,381,034, granted August 7, 1945, may also be employed for this purpose.

It will be noted that the constructions shown and described serve admirably to accomplish the objects stated above. It is to be understood, however, that the various tool forms discussed above are intended merely as illustrative of the invention and not as limiting, as various other modifications thereof may be made without departing from the invention as defined by a proper interpretation of the claims which follow.

I claim:

1. A cutting tool having front clearance and side clearance on at least one side and a connecting rounded corner, the front clearance and side clearance being of different degree and the clearance about said rounded corner viewed in generally vertical planes normal to the various parts of said rounded corner varying gradually from the angle of front clearance to the angle of side clearance.

2. A cutting tool having front clearance and side clearance on both sides and rounded corners connecting the front and sides, the side clearances being different from the front clearance and the clearances of said rounded corners viewed in generally vertical planes normal to the various parts of said rounded corner varying gradually from the angle of front clearance to the respective angle of side clearance.

WALTER MARK BURA.

REFERENCES CITED

The following references are of record in the file of this patent:

UNITED STATES PATENTS

| Number | Name | Date |
|---|---|---|
| 653,165 | Bedford et al. | July 3, 1900 |
| 1,409,960 | McKenzie | Mar. 21, 1922 |
| 1,414,520 | Martin | May 2, 1922 |
| 1,922,178 | Schultz | Aug. 15, 1933 |
| 2,156,354 | Rozmarich | May 2, 1939 |

FOREIGN PATENTS

| Number | Country | Date |
|---|---|---|
| 90,924 | Austria | Jan. 25, 1923 |

OTHER REFERENCES

Metal Cutting Tools, by De Leeuw, published by McGraw-Hill Book Co. Inc., 370 Seventh Ave., New York, 1922, pp. 43–55 inclusive.

Mechanical Engineering, July 1930, vol. 62, No. 7, page 686.